(12) United States Patent
Howe

(10) Patent No.: US 8,903,952 B2
(45) Date of Patent: Dec. 2, 2014

(54) VIDEO STREAMING USING ADAPTIVE TCP WINDOW SIZE

(75) Inventor: Jeffrey J. Howe, West Chicago, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 32 days.

(21) Appl. No.: 13/210,553

(22) Filed: Aug. 16, 2011

(65) Prior Publication Data

US 2013/0046857 A1   Feb. 21, 2013

(51) Int. Cl.
*G06F 15/16* (2006.01)
*H04L 12/815* (2013.01)
*H04L 29/06* (2006.01)

(52) U.S. Cl.
CPC .......... *H04L 65/4069* (2013.01); *H04L 47/225* (2013.01); *H04L 65/80* (2013.01); *H04L 65/608* (2013.01)
USPC ............ 709/219; 709/231; 709/203; 370/390

(58) Field of Classification Search
USPC ................... 709/219, 231, 203, 206; 370/390
See application file for complete search history.

(56) References Cited

U.S. PATENT DOCUMENTS

| 2006/0198300 | A1* | 9/2006 | Li et al. ................... 370/229 |
| 2009/0048939 | A1* | 2/2009 | Williams ................. 705/26 |
| 2011/0010607 | A1* | 1/2011 | Raveendran .............. 714/776 |
| 2011/0167462 | A1* | 7/2011 | O'Connor et al. ........... 725/110 |
| 2012/0014252 | A1* | 1/2012 | Martin .................... 370/235 |

* cited by examiner

*Primary Examiner* — El Hadji Sall
(74) *Attorney, Agent, or Firm* — Troy A. Van Aacken

(57) ABSTRACT

Methods and apparatuses for streaming a video stored on a server to a display device over a network are provided. The TCP receive window size is adjusted to achieve a more uniform transmission of video segments of the video over the network to reduce the bustiness of network traffic.

10 Claims, 3 Drawing Sheets

VIDEO STREAMING USING ADAPTIVE TCP WINDOW SIZE

TECHNICAL FIELD

This disclosure relates to video streaming.

BACKGROUND

Hypertext Transfer Protocol (HTTP) can be used to deliver video (e.g., live broadcasts or prerecorded content) to display devices over a networked environment. For example, a video can be streamed to a display device user using HTTP by first partitioning the video into a series of short video sections where each video section is placed on a server and identified by a Uniform Resource Locator (URL). Each video section typically can correspond to 2 seconds of the video; however, the video section can be longer or shorter than 2 seconds. An index file that contains the URLs of the video sections for the video also is stored on the server and identified by a URL. To play the video, software ("a client") on a display device first retrieves the index file from the server and then sequentially follows each URL in the index file to retrieve from the server and display on the display device each video section.

More specifically, to play the video, the client can connect to the server, and submit a HTTP request message (e.g., an HTTP GET request) to retrieve the index file for the video. The client can connect to the server by creating a (Transmission Control Protocol) TCP connection to port 80 of the server. The server then can send a HTTP response message to the client containing the index file for the desired video. Based on the list of URLs in the index file for the video sections, the client can submit a series of HTTP request messages to the server to sequentially retrieve the video sections for the video.

Typically, once the playback buffer has reached a target size, to maintain a constant playback buffer size, the client submits an HTTP request message for the next video section in the list every 2 seconds.

To support adaptive streaming, the server stores a video at different bitrates so that a client can download portions of the video at different bitrates as network conditions changes. In some implementations, for example, the server stores the video sections at different bitrates and then the index file includes links to alternate index files for the video at the different bitrate streams. The client can switch to an alternate index file at any time during the streaming of the video as conditions warrant.

In other implementations, for example, instead of storing multiple video sections and for each video section storing different bitrate versions of the video section, the server stores one file for each bitrate using, for example, the MPEG-4 Part 14 (ISO/IEC 14496-14) ("MP4") file format. Each MP4 file, which corresponds to the video at a particular bitrate, is segmented into MP4 video fragments. The index file includes a list of the available bitrates for the video and the list of video fragments for the video. To play a video, the client sequentially requests video fragments of the video at a particular bitrate. When the server receives the request, it extracts the MP4 video fragment from the MP4 file corresponding to the requested bitrate and sends the requested MP4 video fragment to the client.

In each of the implementations discussed above, video is streamed to client using HTTP via a series of HTTP request and response messages. The HTTP request messages typically are transmitted every 2 seconds. However, this results in bursty network traffic, which can have an adverse impact on network utilization. Other streaming protocols exist that also result in bursty network utilization characteristic.

DETAILED DESCRIPTION

Various implementations of this disclosure adjust the TCP receive window size in a display device to achieve a more uniform transmission of video sections over the network to reduce the bustiness of network traffic when streaming a video over a network.

Although this disclosure makes reference to HTTP, this disclosure is not intended to be limited to streaming protocols that use HTTP. The concepts disclosed herein can be applied to any existing or future developed streaming protocol.

Figure 1:
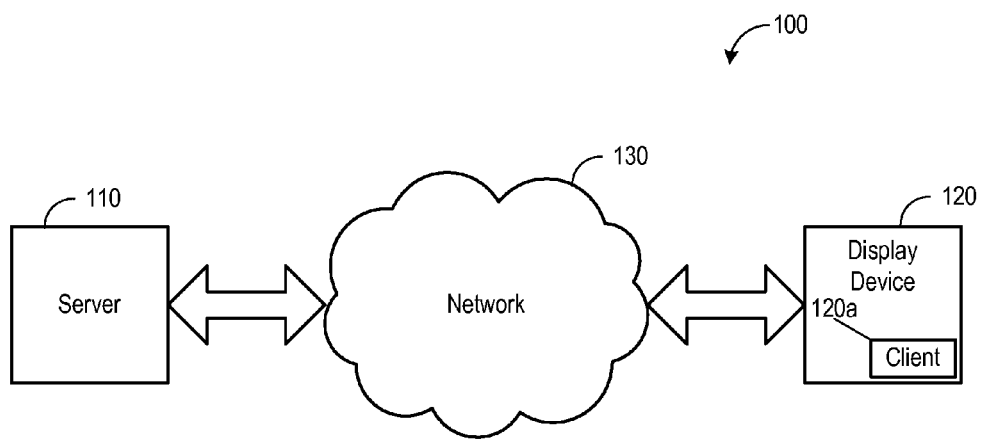
FIG. 1 illustrates an example system for streaming a video stored on a server to a display device over a network.

FIG. 1 illustrates an example system 100 for streaming a video stored on a server 110 to a display device 120 over a network 130. The network 130 can be a single integrated network or a set of separate independent networks and can be any type of wired or wireless network or combination thereof. This disclosure is not limited to any particular system or network. In some implementations, part of the network 130 can be a cable network, which can take the form of an all-coax, all-fiber, or hybrid fiber/coax (HFC) network. In some implementations, the server 110 can be located at a headend where the video is transmitted over a cable network to an end user's cable modem (CM), settop box (STB), or some other device that is integrated with or connected to (directly or indirectly) a display to display the video on the display device 120 (e.g., television or computer).

In one implementation, for example, the server 110 stores a series of short video sections where each video section represents a portion of the video and each video section is identified by a URL. Each video section can corresponds to 2 seconds of video, for example, however, the video section can be longer or shorter than 2 seconds. The server 110 also stores an index file, which is identified by a URL, that contains the URLs of the video sections for the video. To play the video, a client 120a of a display device 120 first retrieves the index file from the server 110 and then sequentially follows each URL in the index file to retrieve from the server 110 and sequentially display on the display device 120 each video section.

As discussed above, in some implementations, the server 110 stores the video sections at different bitrates and then the index file includes links to alternate index files for the video at the different bitrates. The client 120a can switch to an alternate index file at any time during the streaming of the video as network conditions warrant.

In other implementations, as discussed above, instead of storing multiple video sections and for each video section storing different bitrate versions of the video section, the server 110 stores one file for each bitrate using the MP4 file format. Each MP4, which corresponds to the video at a particular bitrate, is segmented into MP4 video fragments. The index file includes a list of the available bitrates for the video and the list of video fragments for the video. To play a video, the client 120a sequentially requests from the server 110 video fragments of the video at a particular bitrate. When the server 110 receives the requests, it extracts the MP4 video fragment from the MP4 file corresponding to the requested bitrate and sends the requested MP4 video fragment to the client 120a.

Figure 2:
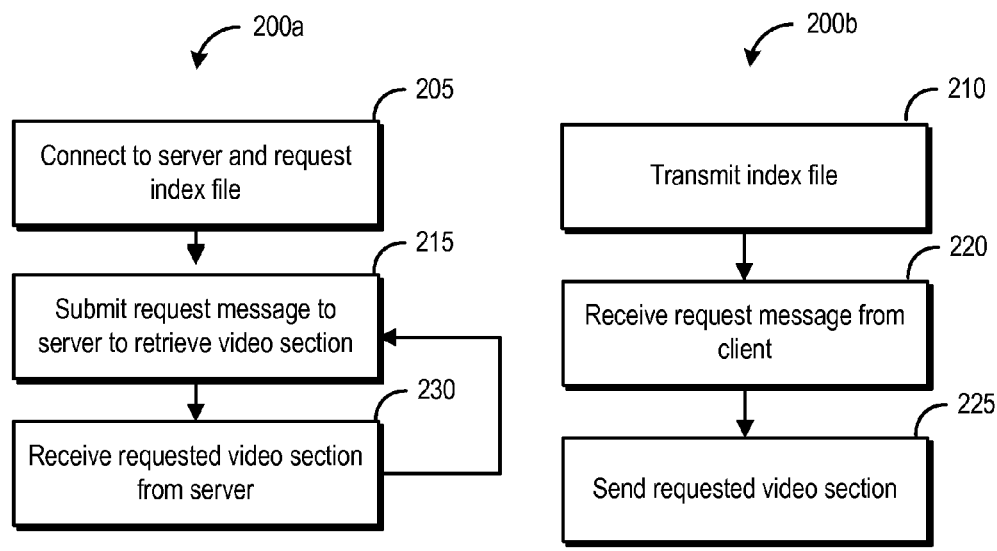
FIGS. 2A and 2B illustrate example processes performed by a client and server, respectively, of the example system of FIG. 1 to stream a video stored on the server to a display device over a network.

FIGS. 2A and 2B illustrate example processes 200a, 200b performed by the client 120a and server 110, respectively, of the example system 100 of FIG. 1 to stream a video stored on the server 110 to the display device 120 over the network 130.

At stage 205, a client (for example client 120a) can connect to a server (for example server 110) using, for example, a URL for the server and then submits a request message (e.g., a HTTP request message) to retrieve an index file for a video. The client can connect to the server by creating a (Transmission Control Protocol) TCP connection to port 80 of the server.

At stage 210, the server can send a response message (e.g., a HTTP response message) to the client containing the index file for the requested video. In some implementations, for example, the index file can contain the URLs of the video sections for the request video as discussed above. In other implementations, for example, the index file can include a list of available bitrates for the video and a list of MP4 video fragments for the video as discussed above. This disclosure is not limited to any particular index file. This disclosure can apply to any existing or future developed streaming method that partitions a video into sections and provides an index file to sequentially retrieve the video sections.

Based on the index file for the requested video, at stage 215, the client can submit a request message to the server to retrieve a first section of the requested video. In some implementations, for example, the first section can be a MP4 video fragment as discussed above. This disclosure is not limited to any particular type of video section of the requested video. This disclosure can apply to any existing or future developed streaming protocol that partitions a video into sections.

At stage 220, the server receives the request message for the video section from the client, and at stage 225, the server sends the requested video section.

At stage 230, the client receives the requested video section from the server.

Stages 215-230 can be repeated for each subsequent request message the client submits to the server to retrieve additional sections of the requested video to play the video on the display device.

As discussed above, the client (e.g., client 120a) can connect to the server (e.g., server 110) by creating a (Transmission Control Protocol) TCP connection to port 80 of the server.

TCP is used to provide more reliable and ordered data delivery between pairs of application programs on host computers (such as the server 110 and display device 120) that are attached to a less reliable communication network (such as network 130). TCP can be used on top of Internet Protocol (IP), which is used to route data from a source host to a destination host across one or more IP networks.

Furthermore, TCP interfaces with the application programs on the host computers. For example, application programs on the host computers transmit data to each other by using TCP to open and close connections and to send and receive data. More specifically, the application program in the sender passes data to the sending TCP state machine. The sending TCP state machine packages the data and uses IP to transmit the data over a communication network to the receiving TCP state machine in the receiver, which ultimately passes the data to the application program in the receiver.

Generally, the TCP is able to transfer a continuous stream of octets in each direction between application programs by packaging some number of octets into segments for transmission over a communication network. When the sending TCP state machine transmits a segment ("TCP segment") containing data, it puts a copy of the segment on a retransmission queue and starts a timer. Each segment of data is identified by a sequence number. If the receiving TCP state machine receives the segment, it places the data from the segment into a receive TCP buffer and sends an acknowledgment. The sending TCP state machine deletes the segment from the retransmission queue when the acknowledgment from the receiving TCP state machine is received. If the acknowledgment is not received before the timer runs out, the segment is retransmitted.

Furthermore, TCP provides a means for the receiving TCP state machine to govern the amount of data sent by the sending TCP state machine. This is achieved by returning in a window field of the acknowledgement the number of octets that the sending TCP state machine is allowed to transmit before receiving permission to send further segments ("receive window size").

Typically, the TCP receive window size in the display device 120 is a large fixed size that is larger than the size of a video section. In this way, assuming the network 130 is not congested, whenever the client 120a sends a request message for a video section, the server 110 will send the entire requested video section thereby causing a spike in the network traffic. As discussed above, the client 120a typically sends the request messages regularly, for example, every 2 seconds. These sequential requests will result in bursts of network traffic every 2 seconds, for example, and can have an adverse impact on network utilization. Accordingly, it can be desirable to reduce the bustiness of network traffic when streaming a video over a network.

To reduce the bustiness when streaming a video over a network, the TCP receive window size in the display device 120 can be reduced to a size smaller than the size of the individual video section files. In this way, the server 110 can partition a video section file across multiple TCP segments and therefore transmit the video section across multiple TCP segment transmissions. Thus, by reducing the TCP receive window size in the display device 120 to a size smaller than the size of the video section file, the video file, will be transmitted over the network at a more uniform bit rate, which can reduce the bustiness of the network traffic when streaming video over a network, such as an IP network, for example.

The TCP receive window size in the display device 120 to achieve a more uniform transmission of the video sections over the network can be computed based on, for example, the round trip latency between the server 110 and the client 120a and the rate of output of the data from the receive TCP buffer. As conditions change (e.g., round trip latency, the relative file size for different rates of adjustable bit rate video, how far into the future the video is currently buffered), the TCP receive window size in the display device 120 can be updated.

Figure 3:
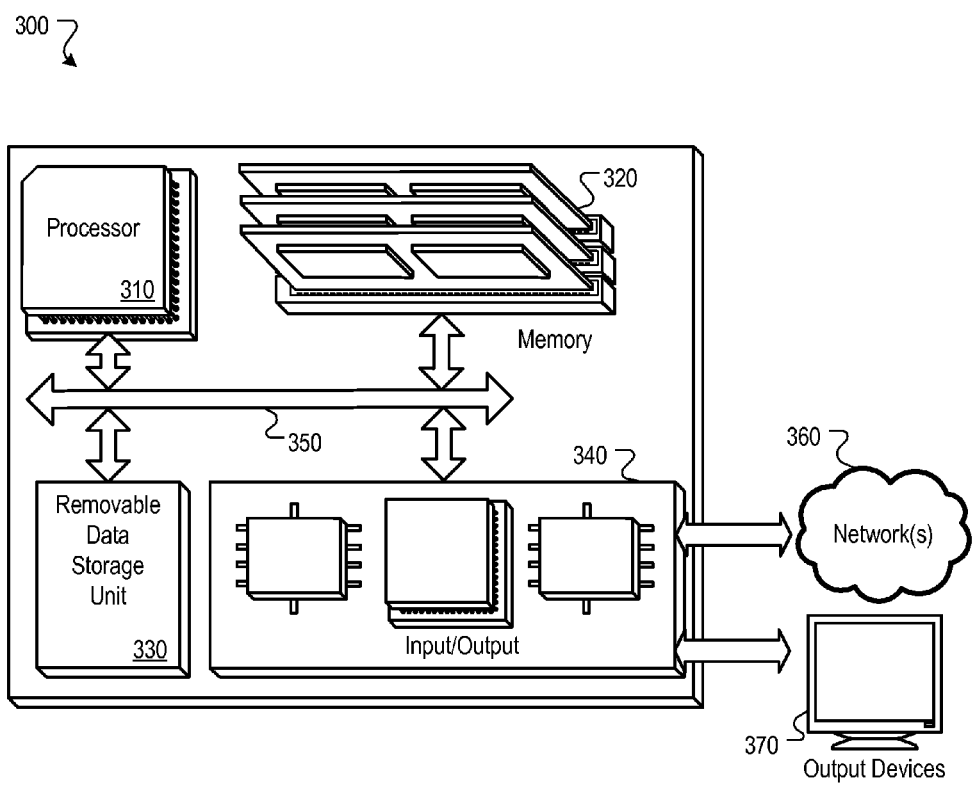
FIG. 3 illustrates an example broadband communications device operable to perform the example processes of FIGS. 2A and 2B.

FIG. 3 illustrates an example client 120a or server 110 operable to perform the example process 200a or 200b of FIGS. 2A-B, respectively.

The client 120a or server 110 can include a processor 310, a memory 320, a removable data storage unit 330, and an input/output device 340. Each of the components 310, 320, 330, and 340 can, for example, be interconnected using a system bus 350. The processor 310 is capable of processing instructions for execution within the client 120a or server 110. For example, the processor 310 can be capable of processing instructions for executing the process 200a or 200b of FIG. 2 in client 120a or server 110, respectively. In some implementations, the processor 310 is a single-threaded processor. In other implementations, the processor 310 is a multi-threaded processor. The processor 310 is capable of processing instructions stored in the memory 320 or on the storage device 330.

The memory 320 stores information within the client 120a or server 110. For example, for client 120a, memory 320 may store video segments. In some implementations, the memory 320 is a computer-readable medium. In other implementations, the memory 320 is a volatile memory unit. In still other implementations, the memory 320 is a non-volatile memory unit.

Implementations of the devices of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for streaming video over a network comprising:
   submitting via a client a first request message to a server to retrieve a video section of a video;
   setting a TCP receive window size such that the video section is received in transmissions of multiple TCP segments; and
   receiving the video section in multiple TCP segment transmissions, wherein the multiple TCP segment transmissions are received before a second request message is submitted;
   wherein the TCP receive window size is set such that the multiple TCP segment transmissions are received uniformly in time between the first request message and the second request message.

2. The method of claim 1 wherein the TCP receive window size is set to a size smaller than the video section.

3. The method of claim 1 further comprising updating the TCP receive window size.

4. The method of claim 3 wherein the TCP receive window is updated based on round trip latency between the client and the server.

5. The method of claim 3 wherein the TCP receive window is updated based on the rate of output of data from a TCP receive buffer.

6. The method of claim 3 wherein the TCP receive window is updated based on the number of stored video sections.

7. The method of claim 1 wherein the request message is an HTTP request message.

8. The method of claim 1 wherein the video section is a MP4 video fragment.

9. A method for streaming video over a network comprising:
   receiving a request message for a video section of a video;
   partitioning the video section into multiple TCP segments based on a TCP receive window size wherein the TCP receive window size is smaller than the video section; and
   receiving the video section in multiple TCP segment transmissions, wherein the multiple TCP segment transmissions are received before a second request message is submitted;
   wherein the TCP receive window size is set such that the multiple TCP segment transmissions are received uniformly in time between the first request message and the second request message.

10. A system for streaming video over a network comprising:
- means for submitting via a client a first request message to a server to retrieve a video section of a video; and
- means for setting a TCP receive window size such that the video section is received in multiple TCP segment transmissions;
- means for receiving the video section in multiple TCP segment transmissions, wherein the multiple TCP segment transmissions are received before a second request message is submitted;
- wherein the TCP receive window size is set such that the multiple TCP segment transmissions are received uniformly in time between the first request message and the second request message.

* * * * *